US009503129B2

(12) United States Patent
Dahlman et al.

(10) Patent No.: US 9,503,129 B2
(45) Date of Patent: Nov. 22, 2016

(54) INTERFERENCE CONTROL BETWEEN DIFFERENT RADIO COMMUNICATION SYSTEMS INVOLVING USER EQUIPMENTS

(75) Inventors: Erik Dahlman, Bromma (SE); Carl Magnus Frodigh, Sollentuna (SE); Anders Furuskär, Stockholm (SE); Niklas Johansson, Sollentuna (SE); Stefan Parkvall, Stockholm (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 0 days.

(21) Appl. No.: 14/389,914

(22) PCT Filed: Apr. 3, 2012

(86) PCT No.: PCT/SE2012/050363
§ 371 (c)(1),
(2), (4) Date: Oct. 1, 2014

(87) PCT Pub. No.: WO2013/151469
PCT Pub. Date: Oct. 10, 2013

(65) Prior Publication Data
US 2015/0087346 A1    Mar. 26, 2015

(51) Int. Cl.
*H04B 1/04*      (2006.01)
*H04B 7/26*      (2006.01)
*H04W 16/14*     (2009.01)
*H04W 72/04*     (2009.01)
(Continued)

(52) U.S. Cl.
CPC .............. *H04B 1/0475* (2013.01); *H04B 7/26* (2013.01); *H04W 16/14* (2013.01); *H04W 72/0406* (2013.01); *H04W 72/082* (2013.01); *H04W 88/06* (2013.01)

(58) Field of Classification Search
CPC   H04W 76/022; H04W 76/023; H04W 8/005
See application file for complete search history.

(56) References Cited

U.S. PATENT DOCUMENTS 8,892,099 B2 *  11/2014  He .................... H04W 36/0094
                                                 455/436
2003/0198200 A1 * 10/2003  Diener ................. H04L 1/1664
                                                 370/329
(Continued)

OTHER PUBLICATIONS

PCT International Search Report, mailed Oct. 16, 2012, in connection with International Application No. PCT/SE2012/050363, all pages.
LG Electronics "Considerations on interference coordination in heterogeneous networks" 3GPP Draft R1-101369. 3GPP, Sophia-Antipolis, Cedex, France, RAN WG1 Meeting #60, San Francisco, CA, USA, Feb. 22-26, 2010, XP050418854, pp. 1-6.
(Continued)

*Primary Examiner* — Bobbak Safaipour
(74) *Attorney, Agent, or Firm* — Leffler Intellectual Property Law, PLLC

(57) ABSTRACT

A first User Equipment (UE), a second UE, a first Radio Network Node (RNN), and methods therein for controlling interference between transmissions in a first system and transmissions in a second system. The first system comprises the first UE and the first RNN serving the first UE. The second system comprises the second UE and a second RNN serving the second UE. The first system has a first priority in a first part of a shared spectrum and the second system has a second priority in the first part of the shared spectrum, wherein the first priority is higher than the second priority. The method in the first UE comprises transmitting a signal to a second RNN that is to perform a downlink transmission to the second UE, which signal is configured to control the transmission of the second RNN.

15 Claims, 9 Drawing Sheets

(51) Int. Cl.
*H04W 72/08* (2009.01)
*H04W 88/06* (2009.01)

(56) References Cited

U.S. PATENT DOCUMENTS

| | | |
|---|---|---|
| 2011/0105135 A1 | 5/2011 | Sandeep et al. |
| 2011/0136494 A1 | 6/2011 | Hee et al. |
| 2011/0281525 A1* | 11/2011 | Furuskar ............ H04B 17/0042 455/67.11 |
| 2012/0300686 A1* | 11/2012 | Maeda .............. H04W 52/0206 370/311 |
| 2015/0245374 A1* | 8/2015 | Mitola, III ............. G06Q 30/08 370/329 |

OTHER PUBLICATIONS

Motorola "HeNB Interference Coordination" 3GPP Draft R1-094839. 3GPP, Sophia-Antipolis, Cedex, France, RAN WG1 Meeting #59, Jeju, South Korea, Nov. 8-14, 2009, XP050389230, pp. 1-4.

LG Electronics "Methods to facilitate the inter-cell coordination in hetergeneous networks" 3GPP Draft R1-106149. 3GPP, Sophia-Antipolis, Cedex, France, RAN WG1 Meeting #63, Jacksonville, USA; Nov. 15-19, 2010, XP050489708, pp. 1-4.

Kim, H. et al. "A dynamic spectrum allocation between network operators with priority-based sharing and negotiation" 2005 IEEE 16th International Symposium on personal, indoor and mobile radio communications, 978-3-8007-2909-8/05, pp. 1004-1008.

* cited by examiner

INTERFERENCE CONTROL BETWEEN DIFFERENT RADIO COMMUNICATION SYSTEMS INVOLVING USER EQUIPMENTS

TECHNICAL FIELD

Embodiments herein relate to a first user equipment, a second user equipment and a first radio network node, as well as to methods therein. In particular, embodiments herein relate to the control of interference between transmissions in a first radio communications system and a second radio communications system.

BACKGROUND

Communication devices such as User Equipments (UE) are enabled to communicate wirelessly in a radio communications system, sometimes also referred to as a radio communications network, a mobile communication system, a wireless communications network, a wireless communication system, a cellular radio system or a cellular system. The communication may be performed e.g. between two user equipments, between a user equipment and a regular telephone and/or between a user equipment and a server via a Radio Access Network (RAN) and possibly one or more core networks, comprised within the wireless communications network.

User equipments are also known as e.g. mobile terminals, wireless terminals and/or mobile stations, mobile telephones, cellular telephones, or laptops with wireless capability, just to mention some examples. The user equipments in the present context may be, for example, portable, pocket-storable, hand-held, computer-comprised, or vehicle-mounted mobile devices, enabled to communicate voice and/or data, via the RAN, with another entity.

The wireless communications network covers a geographical area which is divided into cell areas, wherein each cell area being served by a network node such as a Base Station (BS), e.g. a Radio Base Station (RBS), which sometimes may be referred to as e.g. eNB, eNodeB, NodeB, B node, or BTS (Base Transceiver Station), depending on the technology and terminology used. The base stations may be of different classes such as e.g. macro eNodeB, home eNodeB or pico base station, based on transmission power and thereby also cell size. A cell is the geographical area where radio coverage is provided by the base station at a base station site. One base station, situated on the base station site, may serve one or several cells. Further, each base station may support one or several radio access and communication technologies. The base stations communicate over the radio interface operating on radio frequencies with the user equipments within range of the base stations.

In some RANs, several base stations may be connected, e.g. by landlines or microwave, to a radio network controller, e.g. a Radio Network Controller (RNC) in Universal Mobile Telecommunications System (UMTS), and/or to each other. The radio network controller, also sometimes termed a Base Station Controller (BSC) e.g. in GSM, may supervise and coordinate various activities of the plural base stations connected thereto. GSM is an abbreviation for Global System for Mobile Communications (originally: Groupe Spécial Mobile).

In the context of this disclosure, the expression Downlink (DL) is used for the transmission path from the base station to the mobile station. The expression Uplink (UL) is used for the transmission path in the opposite direction i.e. from the mobile station to the base station.

In 3rd Generation Partnership Project (3GPP) Long Term Evolution (LTE), base stations, which may be referred to as eNodeBs or even eNBs, may be directly connected to one or more core networks.

UMTS is a third generation mobile communication system, which evolved from the GSM, and is intended to provide improved mobile communication services based on Wideband Code Division Multiple Access (WCDMA) access technology. UMTS Terrestrial Radio Access Network (UTRAN) is essentially a radio access network using wideband code division multiple access for user equipments. The 3GPP has undertaken to evolve further the UTRAN and GSM based radio access network technologies.

According to 3GPP/GERAN, a user equipment has a multi-slot class, which determines the maximum transfer rate in the uplink and downlink direction. GERAN is an abbreviation for GSM EDGE Radio Access Network. EDGE is further an abbreviation for Enhanced Data rates for GSM Evolution.

Current radio communication systems are operating in so-called licensed spectrum implying that within a specific geographical region, for example a country, a certain range of frequencies is assigned to a single operator for exclusive usage.

In contrast, current wireless-Local Area Network (LAN) technologies are operating in so-called unlicensed spectrum. Within such an unlicensed spectrum, anyone is allowed to operate transmitter equipments as long as the transmission conforms to some basic requirements, such as constraints on transmit power and transmitter out-of-band emissions. Thus, within a certain geographical region there may be multiple wireless-LAN operators, operating essentially independent of each other, on the same frequency.

Operation in licensed spectrum allows for good control of the interference to which transmissions may be subject. Thus, operation in licensed spectrum allows for high-quality wireless communication even in case of relatively-high-traffic-load situations.

At the same time, in a multi-operator scenario the use of licensed spectrum leads to spectrum fragmentation as the total available spectrum has to be divided into disjoint parts, where each spectrum part is licensed to, and exclusively used by, a certain operator. In a low-traffic-load situation, a substantial part of the spectrum may then locally and instantaneously be unused as, at a certain time, one or several operators may have no active users what-so-ever within a certain area. If that spectrum could be used by other operator (s) the data rates that could instantaneously be offered by an operator may be increased, leading to an overall improved spectrum utilization. However, with conventional spectrum licensing, where each spectrum part is assigned to, and exclusively used by, a single operator, this is not possible.

For operation in unlicensed spectrum the situation is essentially the opposite. In high-traffic-load situations the use of unlicensed spectrum may lead to more unpredictable interference, difficulties to provide good quality-of-service, and, in general, degraded spectrum efficiency. In low-traffic-load situations the use of unlicensed spectrum, where the overall available spectrum is available to every operator, may allow for higher per-operator bandwidth availability, corresponding possibilities for higher data rates, and overall improved spectrum utilization.

In the scientific paper "A dynamic spectrum allocation between network operators with priority-based sharing and negotiation" (2005 IEEE 16$^{th}$ International Symposium on personal, indoor and mobile radio communications, 978-3-8007-2909-8105, pages 1004-1008), a spectrum sharing algorithm is disclosed. In the spectrum sharing algorithm the priority between network operators and the priorities of multiple class services are incorporated into the spectrum sharing metric, while also accommodating the urgent bandwidth request by proposing a negotiation procedure. The proposed scheme allocates the spectrum dynamically, reflecting the long-term occupation ratio between the network operators and the priorities of multiclass services.

A drawback with prior art systems is that it is not possible to combine high robustness at high traffic load (where the use of dedicated spectrum is preferred) with high spectrum efficiency at low traffic load (where flexible spectrum sharing is preferred). The method in the paper referred to above partly addresses this drawback but is, due to the slowness of the method, only able to adapt to long-term occupation of the spectrum and is thus not able to provide good efficiency at low traffic load when the instantaneous traffic demands are varying rapidly.

SUMMARY

An object of embodiments herein is to provide a way of improving the performance in a communications network.

According to a first aspect of embodiments herein, the object is achieved by a method in a first user equipment for controlling interference between transmissions in a first radio communications system and transmissions in a second radio communications system. The first radio communications system comprises the first user equipment and a first radio network node serving the first user equipment. The second radio communications system comprises a second user equipment and a second radio network node serving the second user equipment. The first radio communications system has a first priority in a first part of a shared radio spectrum and the second radio communications system has a second priority in the first part of the shared radio spectrum, wherein the first priority is higher than the second priority.

The first user equipment transmits a signal to a second radio network node that is to perform a downlink transmission to the second user equipment, which signal is configured to control the transmission of the second radio network node.

According to a second aspect of embodiments herein, the object is achieved by a first user equipment for controlling interference between transmissions in a first radio communications system comprising the first user equipment and a first radio network node serving the first user equipment, and transmissions in a second radio communications system comprising a second user equipment and a second radio network node serving the second user equipment. The first radio communications system has a first priority in a first part of a shared radio spectrum and the second radio communications system has a second priority in the first part of the shared radio spectrum, wherein the first priority is higher than the second priority.

The first user equipment comprises a transmitting circuit configured to transmit a signal to a second radio network node that is to perform a downlink transmission to the second user equipment, which signal is configured to control the transmission of the second radio network node.

Since the signal is transmitted from the first user equipment to the second radio network node, the transmission of the second radio network node is controlled, whereby interference from the second base station to the first user equipment is avoided or at least reduced. This results in an improved performance in the communications network.

According to a third aspect of embodiments herein, the object is achieved by a method in a second user equipment for controlling interference between transmissions in a first radio communications system comprising a first user equipment and a first radio network node serving the first user equipment, and transmissions in a second radio communications system comprising a second user equipment and a second radio network node serving the second user equipment. The first radio communications system has a first priority in a first part of a shared radio spectrum and the second radio communications system has a second priority in the first part of the shared radio spectrum, wherein the first priority is higher than the second priority.

The second user equipment receives a signal from the first radio network node, which signal is configured to control a transmission of the second user equipment.

According to a fourth aspect of embodiments herein, the object is achieved by a second user equipment for controlling interference between transmissions in a first radio communications system comprising a first user equipment and a first radio network node serving the first user equipment, and transmissions in a second radio communications system comprising a second user equipment and a second radio network node serving the second user equipment. The first radio communications system has a first priority in a first part of a shared radio spectrum and the second radio communications system has a second priority in the first part of the shared radio spectrum, wherein the first priority is higher than the second priority.

The second user equipment comprises a receiving circuit configured to receive a signal from the first radio network node, which signal is configured to control a transmission of the second user equipment.

Since the second user equipment receives the signal from the first radio network node, the transmission of the second user equipment is controlled, whereby interference from the second user equipment to the first base station is avoided or at least reduced. This results in an improved performance in the communications network.

According to a fifth aspect of embodiments herein, the object is achieved by a method in a first radio network node for controlling interference between transmissions in a first radio communications system comprising a first user equipment and a first radio network node serving the first user equipment, and transmissions in a second radio communications system comprising a second user equipment and a second radio network node serving the second user equipment. The first radio communications system has a first priority in a first part of a shared radio spectrum and the second radio communications system has a second priority in the first part of the shared radio spectrum, wherein the first priority is higher than the second priority.

The first radio network node transmits a signal to the second user equipment, which signal is configured to control a transmission of the second user equipment.

According to a sixth aspect of embodiments herein, the object is achieved by a first radio network node for controlling interference between transmissions in a first radio communications system comprising a first user equipment and a first radio network node serving the first user equipment, and transmissions in a second radio communications system comprising a second user equipment and a second radio network node serving the second user equipment. The first radio communications system has a first priority in a first part of a shared radio spectrum and the second radio communications system has a second priority in the first part of the shared radio spectrum, wherein the first priority is higher than the second priority.

The first radio network node comprises a transmitting circuit configured to transmit a signal to the second user equipment, wherein the signal is configured to control a transmission of the second user equipment.

Since the first radio network node transmits a signal to the second user equipment, the transmission of the second user equipment is controlled. Thereby, interference from the second user equipment to the first base station is avoided or at least reduced. This results in an improved performance in the communications network.

According to a seventh aspect of embodiments herein, the object is achieved by a method in a second user equipment for controlling interference between transmissions in a first radio communications system comprising a first user equipment and a first radio network node serving the first user equipment, and transmissions in a second radio communications system comprising a second user equipment and a second radio network node serving the second user equipment. The first radio communications system has a first priority in a first part of a shared radio spectrum and the second radio communications system has a second priority in the first part of the shared radio spectrum, wherein the first priority is higher than the second priority.

The second user equipment receives a signal from the first radio network node, which signal is configured to inform the second user equipment that the first radio network node intends to transmit a downlink signal to the first user equipment at a certain point in time.

Further, based on the signal received from the first radio network node, the second user equipment transmits an uplink signal to the second radio network node, which uplink signal controls whether or not the second radio network node should transmit a downlink signal to the second user equipment.

According to an eight aspect of embodiments herein, the object is achieved by a second user equipment for controlling interference between transmissions in a first radio communications system comprising a first user equipment and a first radio network node serving the first user equipment, and transmissions in a second radio communications system comprising a second user equipment and a second radio network node serving the second user equipment. The first radio communications system has a first priority in a first part of a shared radio spectrum and the second radio communications system has a second priority in the first part of the shared radio spectrum, wherein the first priority is higher than the second priority:

The second user equipment comprises a receiving circuit configured to receive a signal from the first radio network node, which signal is configured to inform the second user equipment that the first radio network node intends to transmit a downlink signal at a certain point in time.

Further, the second user equipment comprises a transmitting circuit configured to, based on the reception of the signal from the first radio network node, transmit an uplink signal to the second radio network node, which uplink signal controls whether or not the second radio network node should perform a downlink transmission to the second user equipment.

Since the second user equipment receives the signal from the first radio network node, and since the second user equipment transmits an uplink signal to the second radio network node, which uplink signal controls whether or not the second radio network node should perform a downlink transmission to the second user equipment, the transmission of the second radio network node is controlled. Thereby, unnecessary transmissions from the second base station, creating unnecessary interference, is avoided or at least reduced. This results in an improved performance in the communications network.

An advantage of embodiments herein is that the benefits of both a licensed spectrum operation and an unlicensed spectrum operation are achieved. That means that the same available spectrum is made available to multiple operators, similar to unlicensed spectrum operation, while, at the same time, more controlled interference situations is provided similar to conventionally licensed spectrum.

A further advantage of embodiments herein is that the overall available spectrum is available to each operator similar to unlicensed spectrum operation.

A yet further advantage of embodiments herein is that a controlled interference situation similar to licensed spectrum operation is provided.

BRIEF DESCRIPTION OF THE DRAWINGS

Embodiments will be described in more detail with reference to the following drawings, in which.

DETAILED DESCRIPTION

Embodiments herein will be exemplified in the following non-limiting description.

Embodiments described herein provide a spectrum-sharing solution that achieves the benefits of both licensed and unlicensed spectrum operation. In other words, embodiments herein make the same available spectrum available to multiple operators, similar to unlicensed spectrum operation, while, at the same time, provide more controlled interference situations similar to conventionally licensed spectrum operation.

Figure 1:
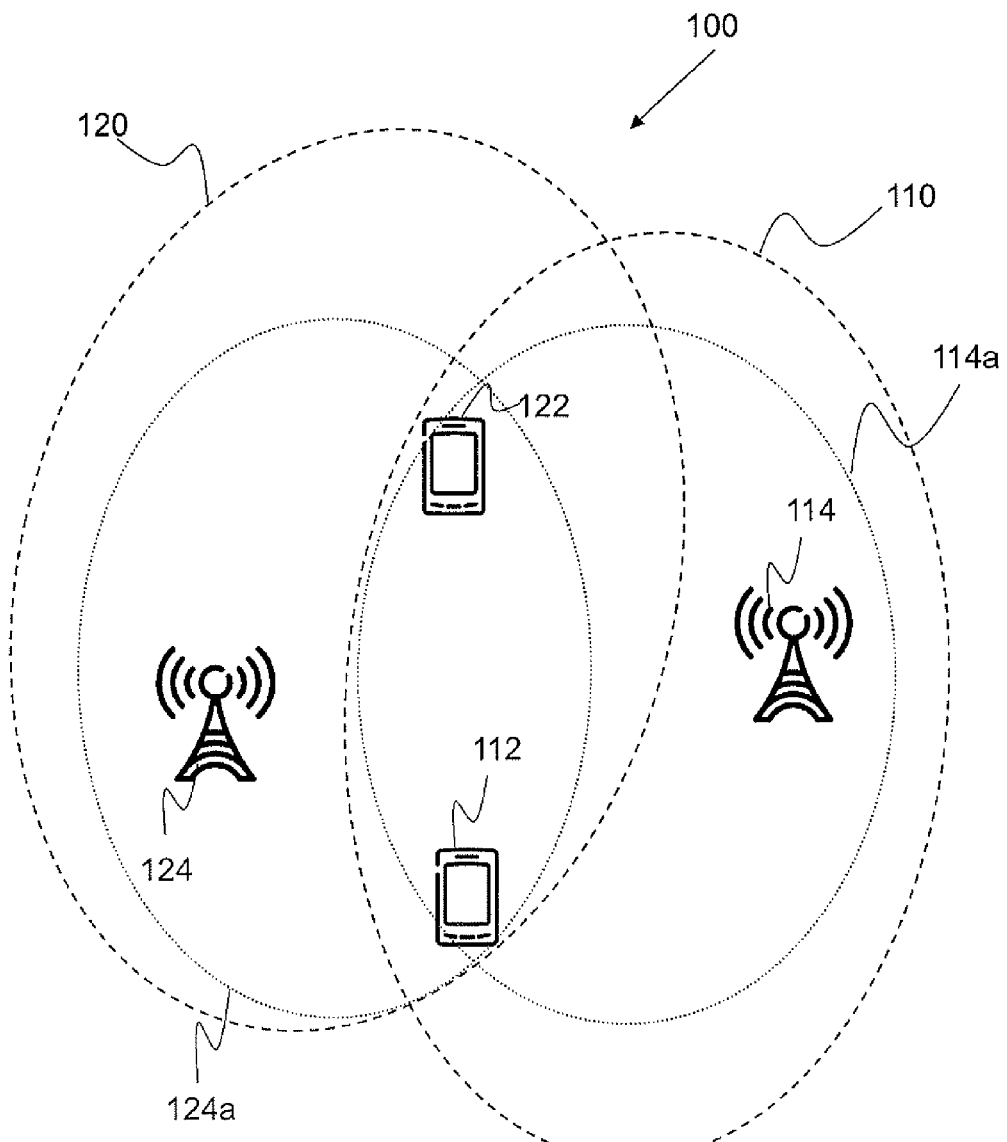
FIG. 1 is a schematic block diagram illustrating embodiments of a communications network.

FIG. 1 schematically illustrates embodiments of a radio communications system 100. The radio communication system 100 may be a 3GPP communications system or a non-3GPP communications system.

The radio communications system 100 comprises a first radio communications system 110, which first radio communications system 110 may be a 3GPP communications system or a non-3GPP communications system. The first radio communications system 110 comprises a first user equipment 112 and a first radio network node 114 serving the first user equipment 112.

The first user equipment 112 may be e.g. a mobile terminal or a wireless terminal, a mobile phone, a computer such as e.g. a laptop, a tablet pc such as e.g. an iPad™, a Personal Digital Assistant (PDA), or any other radio network unit capable to communicate over a radio link in a cellular communications network. The first user equipment 112 may further be configured for use in both a 3GPP network and in a non-3GPP network.

The first radio network node 114 may be a base station such as an eNB, an eNodeB, Node B or a Home Node B, a Home eNode B, a radio network controller, a base station controller, an access point, a relay node (which may be fixed or movable), a donor node serving a relay, a GSM/EDGE radio base station, a Multi-Standard Radio (MSR) base station or any other network unit capable to serve the first user equipment 112 in the cellular communications system.

Further, the first radio network node 114 provides radio coverage over at least one geographic area 114a. The at least one geographic area 114a may form a cell. The first user equipment 112 transmits data over a radio interface to the first radio network node 114 in an uplink (UL) transmission and the first radio network node 114 transmits data to the first user equipment 112 in a downlink (DL) transmission. A number of other user equipments, not shown, may also be located within the geographic area 114a.

The radio communications system 100 comprises further a second radio communications system 120, which second radio communications system 120 may be a 3GPP communications system or a non-3GPP communications system. The second radio communications system 120 comprises a second user equipment 122 and a second radio network node 124 serving the second user equipment 122.

The second user equipment 122 may be e.g. a mobile terminal or a wireless terminal, a mobile phone, a computer such as e.g. a laptop, a tablet pc such as e.g. an iPad™, a Personal Digital Assistant (PDA), or any other radio network unit capable to communicate over a radio link in a cellular communications network. The second user equipment 122 may further be configured for use in both a 3GPP network and in a non-3GPP network.

The second radio network node 124 may be a base station such as an eNB, an eNodeB, Node B or a Home Node B, a Home eNode B, a radio network controller, a base station controller, an access point, a relay node (which may be fixed or movable), a donor node serving a relay, a GSM/EDGE radio base station, a Multi-Standard Radio (MSR) base station or any other network unit capable to serve the second user equipment 122 in the cellular communications system.

Further, the second radio network node 124 provides radio coverage over at least one geographic area 124a. The at least one geographic area 124a may form a cell. The second user equipment 122 transmits data over a radio interface to the second radio network node 124 in an uplink (UL) transmission and the second radio network node 124 transmits data to the second user equipment 122 in a downlink (DL) transmission. A number of other user equipments, not shown, may also be located within the geographic area 124a.

FIG. 1 schematically illustrates a general situation addressed by embodiments herein. Within a certain area there are two communications systems; the first communications system 110 and the second communications system 120, corresponding to two different operators. However, it should be understood that the number of communications system sharing a certain area may be may be more than two, as may the number of operators.

As previously described, each of the first and second communications system 110,120 comprises one or more user equipments 112,122, and one or more radio network nodes 114,124.

Further, the two communications systems; the first and the second communication systems 110,120, are operating in the same shared spectrum and the aim is to allow for both communications systems 110,120 to be able to use the shared spectrum while avoiding unacceptably high interference between the two communications systems 110.

It is assumed herein that the first communications system 110 has a higher priority than the second communications system 120. By higher priority is meant that the first communications system 110 for example has a higher priority in terms of having access to the spectrum as compared to the second communications system 120. Thus, if there are transmissions from the first communications system 110 within the spectrum, the second communications system 120 should only use the spectrum in such a way that transmissions from the second communications system 120 do not cause unacceptable interference to transmissions from the first communications system 110.

The priorities of the communications systems 110,120 within the shared radio spectrum are set, e.g. predefined, by the owner or the administrator of the shared radio spectrum. The priorities may for example be change over time or between different parts of the shared radio spectrum, as will be described below. The priority of the first communications system 110 may be signalled from the first radio network node 114 to the first user equipment 112, and the priority of the second communications system 120 may be signalled from the second radio network node 124 to the second user equipment 122. Further, the first and second radio network node 114,124 may have information about the priorities of other communications systems comprised in the communication system 100. This priority information may also be signalled from the respective radio network node 114,124 to the respective user equipment 112,122. By unacceptably high interference or unacceptable interference, when used herein, is meant an interference that degrades the communication quality within the communication system having the highest priority such that the communication quality within the communication system having the highest priority is below a pre-defined quality of service level. Thus, an acceptable interference does not degrade the communication quality within the communication system having the highest priority to be below the pre-defined quality of service level.

By the term "pre-defined quality of service level" when used in this description is meant a level that is set or configured in advance, e.g. before the operation, wherein it is used, is executed. It should be understood that the pre-defined level may be changed, e.g. in dependence of service quality requirements.

Figure 2:
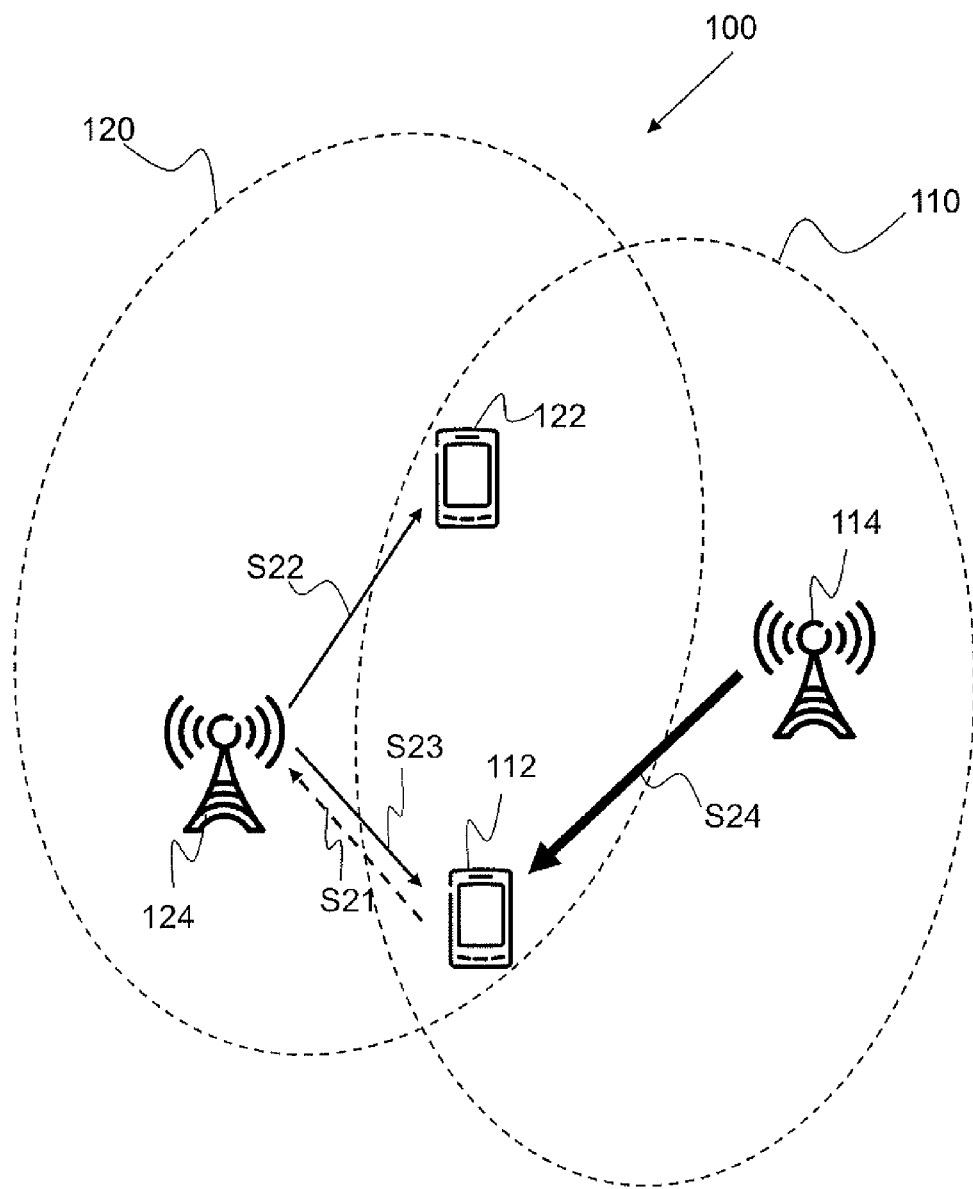
FIG. 2 is a schematic combined block diagram and signalling scheme illustrating embodiments of a communications network.

FIG. 2 schematically illustrates a combined block diagram and signalling scheme of embodiments of the communications system 100. As illustrated in FIG. 1, the communications system 100 comprises the first communications system 110, which comprises the first user equipment 112 and the first radio network node 114 serving the first user equipment 112. The communications system 100 comprises further the second communications system 120, which comprises the second user equipment 122 and the second radio network node 124 serving the second user equipment 122.

The first radio communications system 110 has a first priority in a first part of a shared radio spectrum and the second radio communications system 120 has a second priority in the first part of the shared radio spectrum, wherein the first priority is higher than the second priority. The geographic areas 114a, 124a are not shown in FIG. 2 for clarity reason.

As schematically illustrated in FIG. 2, a downlink transmission S22 from the second radio network node 124 to the second user equipment 122 may interfere, by means of an interfering signal S23, a downlink transmission S24 from the first radio network node 114 to the first user equipment 112. Since the first radio communication system 110 has a higher priority than the second radio communication system 120, the downlink transmission S24 from the first radio network node 114 to the first user equipment 112 is a prioritized transmission. This is indicated by a thick arrow in FIG. 2. Some embodiments herein provide for the second radio network node 124 to be informed about the potential interference situation. This is performed by means of a signal S21 transmitted by the first user equipment 112, which signal S21 informs about the potential interference situation. The signal S21 is indicated by a dashed arrow in FIG. 2. The second radio network node 124 may therefore avoid or at least modify some part of the transmission S22, thereby avoiding causing unacceptable interference to the higher-priority first communications system 110.

Figure 5:
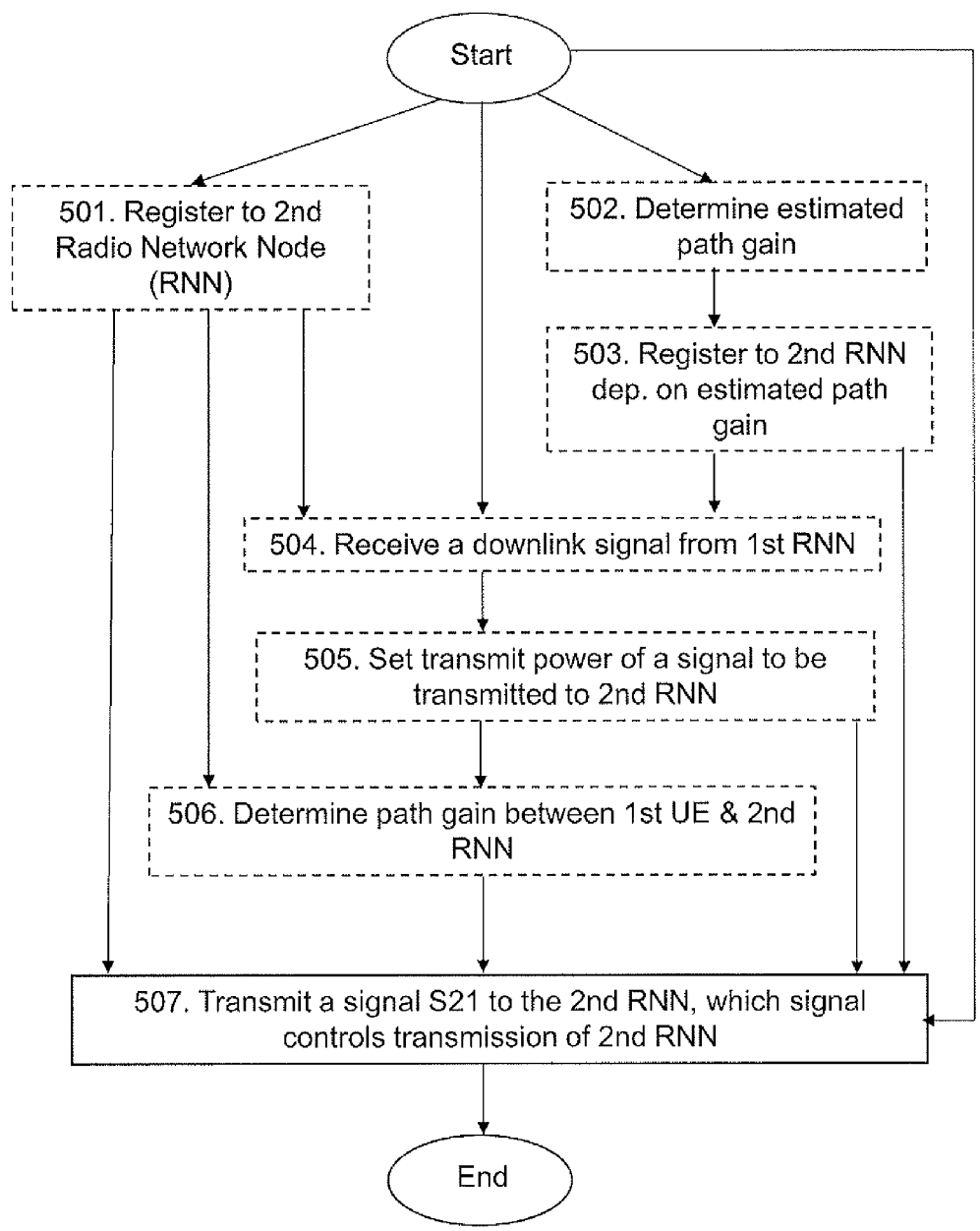
FIG. 5 is a flowchart depicting embodiments of a method in a first user equipment.

A method in the first user equipment 112 relating to this scenario will be described in more detail below with reference to FIG. 5.

Figure 3:
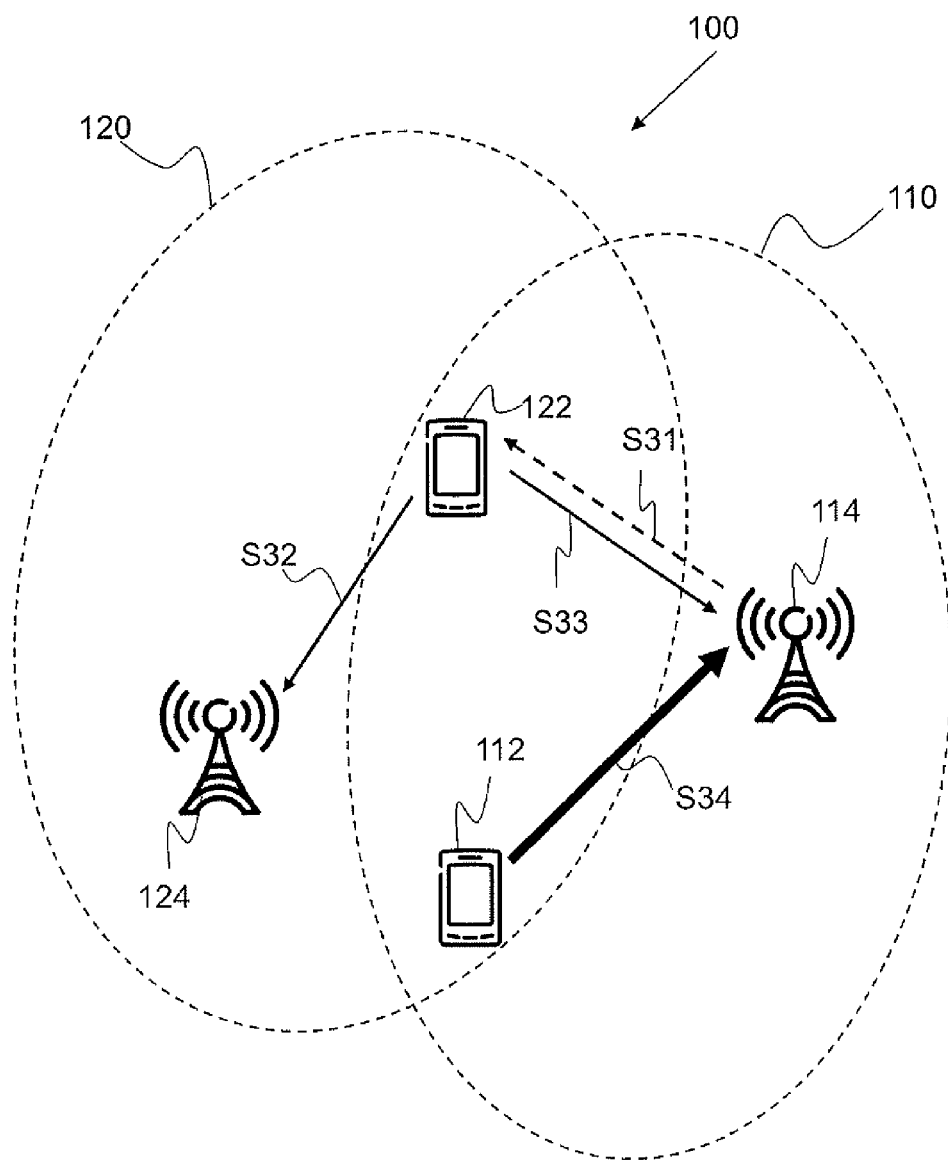
FIG. 3 is a schematic combined block diagram and signalling scheme illustrating embodiments of a communications network.

FIG. 3 schematically illustrates a combined block diagram and signalling scheme of embodiments of the communications system 100. As illustrated in FIG. 1, the communications system 100 comprises the first communications system 110, which comprises the first user equipment 112 and the first radio network node 114 serving the first user equipment 112. The communications system 100 comprises further the second communications system 120, which comprises the second user equipment 122 and the second radio network node 124 serving the second user equipment 122. The first radio communications system 110 has a first priority in a first part of a shared radio spectrum and the second radio communications system 120 has a second priority in the first part of the shared radio spectrum, wherein the first priority is higher than the second priority. The geographic areas 114a, 124a are not shown in FIG. 3 for clarity reason.

As schematically illustrated in FIG. 3, an uplink transmission S32 from the second user equipment 122 to the second radio network node 124 may interfere, by means of an interfering signal S33, an uplink transmission S34 from the first user equipment 112 to the first radio network node 114. Since the first radio communication system 110 has a higher priority than the second radio communication system 120, the uplink transmission S34 from the first user equipment 112 to the first radio network node 114 is a prioritized transmission. This is indicated by a thick arrow in FIG. 3. In such case, embodiments herein provide for the second user equipment 122 to be informed, by means of a signal S31 transmitted from the first radio network node 114, about this potential interference situation. The signal S31 is indicated by a dashed arrow in FIG. 3. Thereby, the second user equipment 122 may avoid or at least modify some part of the transmission S32. This may be done regardless of whether or not the second user equipment 122 has been scheduled for uplink transmission by the second radio network node 124.

Figure 6:
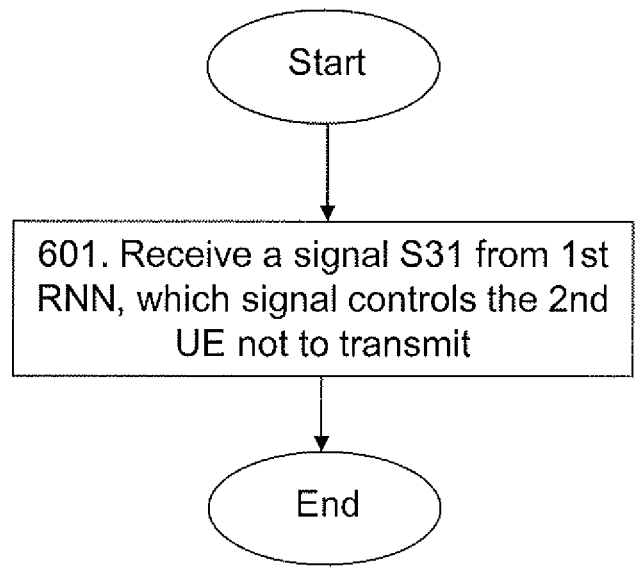
FIG. 6 is a flowchart depicting embodiments of a method in a second user equipment.
Figure 7:
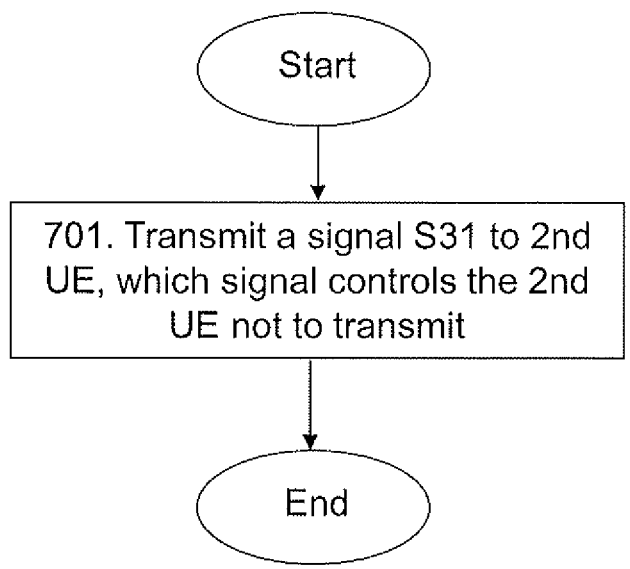
FIG. 7 is a flowchart depicting embodiments of a method in a first radio network node.

A method in the second user equipment 122 and a method in the first radio network node 114 relating to this scenario will be described in more detail below with reference to FIGS. 6 and 7, respectively.

Figure 4:
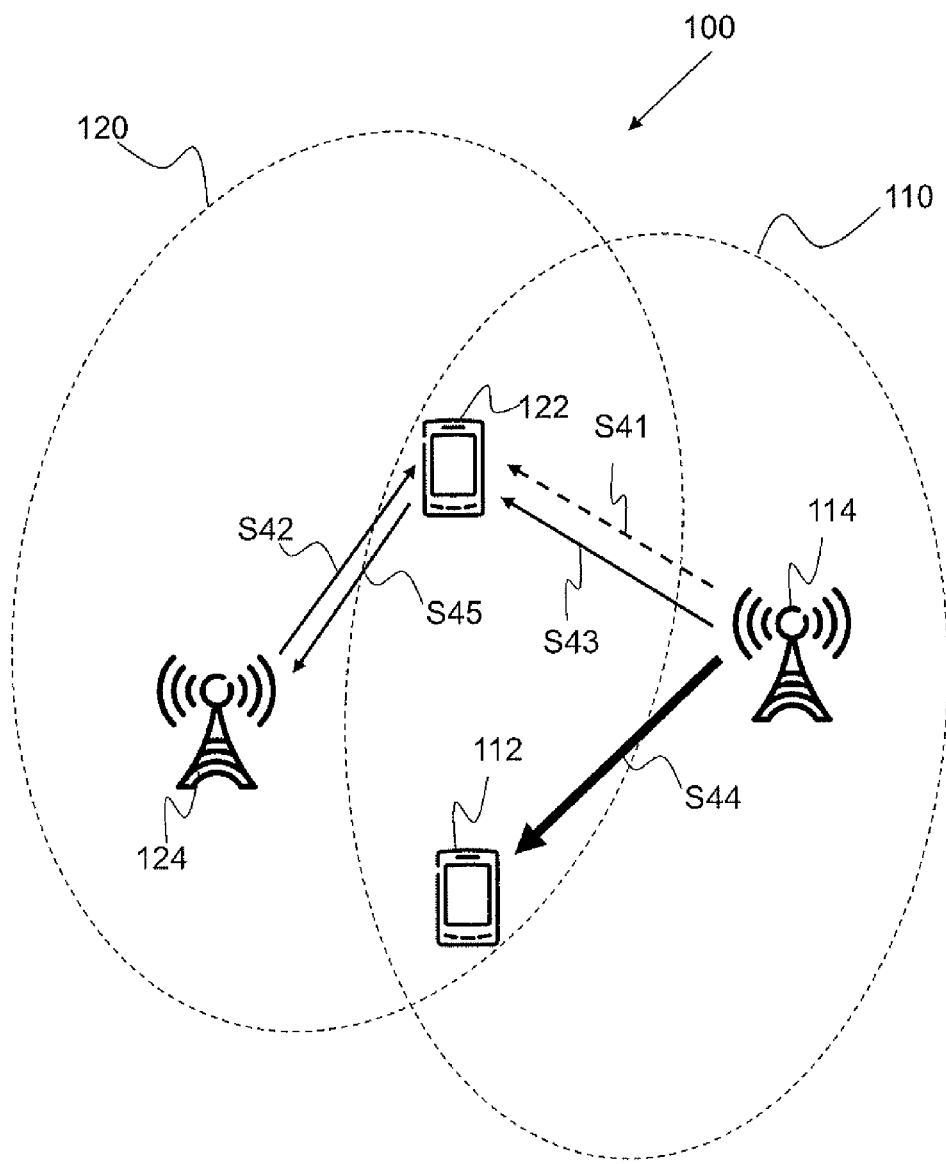
FIG. 4 is a schematic combined block diagram and signalling scheme illustrating embodiments of a communications network.

FIG. 4 schematically illustrates a combined block diagram and signalling scheme of embodiments of the communications system 100. As illustrated in FIG. 1, the communications system 100 comprises the first communications system 110, which comprises the first user equipment 112 and the first radio network node 114 serving the first user equipment 112. The communications system 100 comprises further the second communications system 120, which comprises the second user equipment 122 and the second radio network node 124 serving the second user equipment 122. The first radio communications system 110 has a first priority in a first part of a shared radio spectrum and the second radio communications system 120 has a second priority in the first part of the shared radio spectrum, wherein the first priority is higher than the second priority. The geographic areas 114a, 124a are not shown in FIG. 4 for clarity reason.

As schematically illustrated in FIG. 4, a downlink transmission S44 from the first radio network node 114 to the first user equipment 122 may interfere, by means of an interfering signal S43, a downlink transmission S42 from the second radio network node 124 to the second user equipment 122. Since the first radio communication system 110 has a higher priority than the second radio communication system 120, the downlink transmission S44 from the first radio network node 114 to the first user equipment 112 is a prioritized transmission. This is indicated by a thick arrow in FIG. 4. In such case, embodiments herein provide for the second user equipment 122 to discover this potential interference situation, e.g. by receiving a signal S41 from the first radio network node 114, and inform, by means of a signal S45, the second radio network node 124 about it. The signal S41 is indicated by a dashed arrow in FIG. 4. The second radio network node 124 may then avoid making the transmission S42 that would anyway most likely fail due to severe interference S43 from the first communications system 110.

Figure 8:
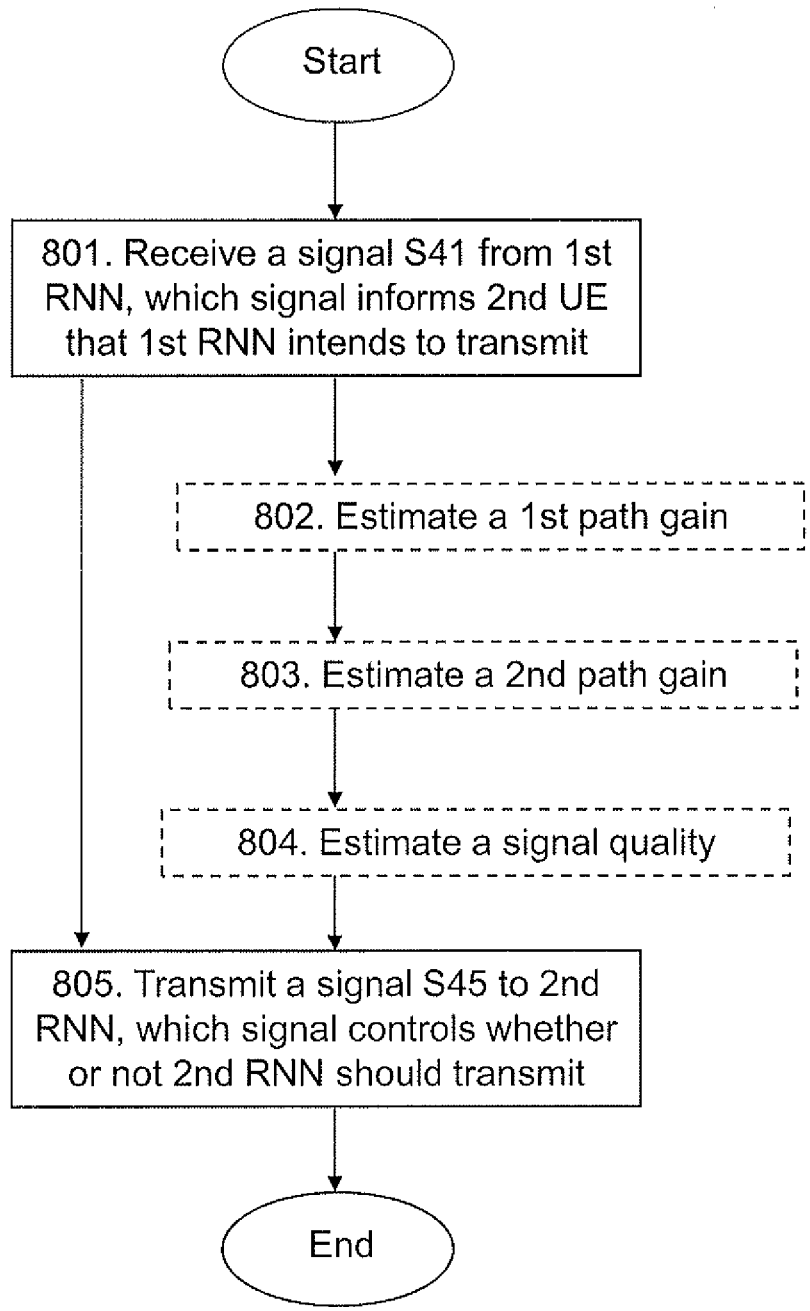
FIG. 8 is a flowchart depicting embodiments of a method in a second user equipment.

A method in the second user equipment 122 relating to this scenario will be described in more detail below with reference to FIG. 8.

Even if not described in more detail herein, it should be understood that a similar interference situation (not shown) may occur in an uplink transmission from the first user equipment 112 to the first radio network node 114. Thus, an uplink transmission from the first user equipment 112 to the first radio network node 114 may interfer an uplink transmission from the second user equipment 122 to the second radio network node 124. In such case, the second radio network node 124 should not schedule an uplink transmission from the second user equipment 122.

A method in a first user equipment 112 for controlling interference between transmissions in the first radio communications system 110 and transmissions in the second communications system 120 will now be described with reference to FIG. 5, and to the previously described scenario of FIG. 2 for the schematic illustration of the signals S21-S24.

As previously mentioned, the first communications system 110 comprises the first user equipment 112 and the first radio network node 114 serving the first user equipment 112. Further, the second radio communications system 120 comprises the second user equipment 122 and the second radio network node 124 serving the second user equipment 122.

The first radio communications system 110 has a first priority in a first part of a shared radio spectrum and the second radio communications system 120 has a second priority in the first part of the shared radio spectrum, wherein the first priority is higher than the second priority.

The actions do not have to be performed in the order stated below, but may be taken in any suitable order. Further, actions may be combined. Optional actions are indicated by dashed boxes.

Action 501

In order to inform one or more radio network nodes 124 that they should obey a signal S21 received from the first user equipment 112, the first user equipment 112 may register to the one or more second radio network nodes 124 by performing high level signalling.

By the term "register/registering" when used herein should be understood to mean that the one or more second radio network nodes 124 receive information that they should listen to and obey a signal S21 received from the first user equipment 112.

In some embodiments, the first user equipment 112 register to the one or more radio network nodes 124 by communicating with the second radio network node 124 in advance, such as before the first user equipment 112 transmits the signal S21.

However, it should be understood that the first user equipment 112 may register with the second radio network node 124 via the first communication system 110, whereby the second radio network node 124 may be informed by the first communication system 110 via backhaul signalling to listen to and obey possible S21 signalling from the first user equipment 112.

Action 502

In some embodiments, in order to determine when to register to a second radio network node 124, the first user equipment 112 may determine an estimate of a path loss between the first user equipment 112 and the second radio network node 124, and an estimate of a path loss between the first user equipment 112 and the first radio network node 114. As will be mentioned in Action 503 below, the first user equipment 112 may register to the second radio network node 124 based on the determined path loss estimates.

In some embodiments, the first user equipment 112 may determine a relative path loss as the estimate of the path loss between the first user equipment 112 and the second radio network node 124 relative to the estimate of the path loss between the first user equipment 112 and the first radio network node 114.

The first user equipment 112 may determine the path loss as the difference between the transmit power that a received signal was transmitted with and the power the received signal had when it was received at the first user equipment 112.

The first user equipment 112 may measure the power of a received signal. Further, information about the transmit power may be comprised in the received signal. In some embodiments, information about the transmit power is signalled separately from the respective radio network node 114,124 to the first user equipment 112.

However, in some embodiments, the first user equipment 112 has no knowledge about the transmit power of signals transmitted from the radio network nodes 114,124. In such embodiments, the first user equipment 112 may assume that the transmit power of signals transmitted from the first radio network node 114 is the same as the transmit power of signals transmitted from the second radio network node 124.

In some embodiments, when the first user equipment 112 has no knowledge about the transmit power of signals transmitted from the radio network nodes 114,124, the first user equipment 112 may have knowledge about a relationship between the transmit power of signals transmitted from the first radio network node 114 and the transmit power of signals transmitted from the second radio network node 124. For example, the first user equipment 112 may know that the first radio network node 114 transmits signals with a transmit power that is 10 percent higher than the transmit power of signals transmitted from the second radio network node 124. This may be used when calculating the relative path loss.

Action 503

In some embodiments, the first user equipment 112 registers to the second radio network node 124 based on the determined path loss estimates.

For example, the first user equipment 112 may register to the second radio network node 124 when the determined path loss estimates are below a respective predefined value.

In some embodiments, the first user equipment 112 registers to the second radio network node 124 when the relative path loss is below a predefined value. If the relative path loss is below the predefined value, a transmission S22 from the second radio network node 124 to the second user equipment 122 is considered to cause an unacceptable interference S23 at the first user equipment 112.

It should be understood that in case the relative path loss has been determined, the first user equipment 112 registers to the second radio network node 124 when the relative path loss is below a predefined value.

The pre-defined value may be a value that has been configured by the first radio network node 114 and communicated from the first radio network node 114 to the first user equipment 112.

Whether or not the second radio network node 124 should react to the signal S21 from the first user equipment 112 may depend on the signal strength by which the signal S21 is received at the second radio network node 124. For example, the second radio network node 124 should react to the signal S21 if the received signal power is above a certain threshold value. This is based on an assumption that the stronger the signal S21 is received at the second radio network node 124, the smaller is the path loss between the second radio network node 124 and the first user equipment 112. In this case, the first user equipment 112 sets the transmit power of the signal S21 depending on the power by which the first user equipment 112 receives a downlink signal from the first radio network node 114. Essentially, the lower the received power of the downlink signal from the first radio network node 114, the stronger the transmit power of the signal S21 in order for the signal S21 to reach the second radio network node 124. This is described in actions 504 and 505 below.

By the term "pre-defined value" when used in this description is meant a value that is set or configured in advance, e.g. before the operation, wherein it is used, is executed. It should be understood that the pre-defined value may be changed, e.g. in dependence of service quality requirements.

Action 504

In some embodiments, the first user equipment 112 receives a downlink signal S24 from the first base station 114.

Action 505

Upon reception of the downlink signal S24 from the first bases station 114 mentioned in action 504 above, the first user equipment 112 may set the transmit power of a signal S21 to be transmitted to the second base station 124. As will be described in action 507, the signal S21 is configured to control the transmission S22 of the second radio network node 124 in order to avoid unacceptable interference at the first user equipment 112.

Action 506

In some embodiments, the first user equipment 112 determines an estimate of a path loss between the first user equipment 112 and the second radio network node 124. As mentioned under Action 502, the first user equipment 112 may determine the path loss as the difference between the transmit power of the received signal and a measured power of the received signal. Further, as will be described in action 507 below, the value of the estimated path loss in relation to a predefined value may control whether or not the first user equipment 112 will transmit the signal S21 to the second radio network node 124.

Action 507

In order to avoid unacceptable interference at the first user equipment 112, the first user equipment 112 transmits the signal S21 to the second radio network node 124, which second radio network node 124 is to perform a downlink transmission S22 to the second user equipment 122. The signal S21 is configured to control the transmission S22 of the second radio network node 124.

In some embodiments, the signal S21 is configured to inform the second base station 124 that the downlink transmission S22 will interfere, by means of an interfering signal S23, a downlink transmission S24 from the first base station 114 to the first user equipment 112.

The signal S21 may be configured to prevent the second radio network node 124 from performing the downlink transmission S22.

The signal S21 may be configured to control the second radio network node 124 to transmit only with a limited transmit power. The limited transmit power may be a reduced transmit power as compared to the normal maximum transmit power.

In some embodiments, the signal S21 is configured to control the second radio network node 124 to perform only downlink control signalling S22.

Further, the signal S21 may further be configured to control the downlink transmission S22 of the second radio network node 124 for a specific period of time or for a specific frequency resource.

In some embodiments, the signal S21 is dedicated for the second radio network node 124 and the first user equipment 112 transmits the signal S21 on a radio resource dedicated for the second radio network node 124. The dedicated radio resource may comprise a time-domain resource, a frequency-domain resource, a code-domain resource or a combination thereof. In such embodiments, when the first user equipment 112 wants to control the transmission of a plurality of second radio network nodes 124, the first user equipment 112 has to transmit a plurality of S21 signals on different resources, one for each second radio network node 124.

In some other embodiments, the signal S21 is non-dedicated for the second radio network node 124 and valid for one or more other second radio network nodes. In such embodiments, the first user equipment 112 transmits the signal S21 on a radio resource non-dedicated for the second radio network node 124. The radio resource may comprise a time-domain resource, a frequency-domain resource, a code-domain resource or a combination thereof. In such embodiments, when the first user equipment 112 wants to control the transmission of a plurality of second radio network nodes 124, the first user equipment 112 has to transmit only one S21 signal on one resource.

In some embodiments, the first user equipment 112 may transmit the signal S21 in a resource dedicated for the first user equipment 112. The dedicated resource may comprise a time-domain resource, a frequency-domain resource, a code-domain resource or a combination thereof. However, the first user equipment 112 may also transmit the signal S21 in a resource non-dedicated for the first user equipment 112. The non-dedicated resource, sometimes also referred to as a common resource, may comprise a time-domain resource, a frequency-domain resource, a code-domain resource or a combination thereof.

When a path loss estimate between the first user equipment 112 and the second radio network node 124 has been determined as described in action 506 above, the first user equipment 112 transmits the signal S21 to the second radio network node 124 when the determined path loss estimate is below a predefined value.

In some embodiments, during an on-going transmission session from the first radio network node 114 to the first user equipment 112, the first user equipment 112 transmits the signal S21 to the second radio network node 124 based on an expectation to receive a downlink transmission S24 from the first radio network node 114 at certain point in time. Since, the transmission session is an on-going transmission session between the first user equipment 112 and the first radio network node 114, the first user equipment 112 is in active mode and therefore knows that it will receive the downlink transmission 824 from the first radio network node 114 at some point in time. The downlink transmission S24 would be interfered by a downlink transmission S23 from the second radio network node 124 at the same point in time.

The transmission of the signal S21 may also, additionally or alternatively, be conditioned on estimates by the first user equipment 112 of to what extent it would be interfered by the second radio network node 124 when it transmits. Such estimation could e.g. be based on the first user equipment's 112 estimates of the path loss or some other related measure, to the second radio network node 124. Only if the estimated path loss is below a certain predefined value or if the estimated interference is above a certain predefined value and the first user equipment 112 expects that it is to receive the downlink transmission S24 from the first radio network node 114, the first user equipment 112 will transmit the signal S21.

A method in a second user equipment 122 for controlling interference between transmissions in the first radio communications system 110 and transmissions in the second communications system 120 will now be described with reference to FIG. 6, and to the previously described scenario of FIG. 3 for the schematic illustration of the signals S31-S34.

As previously mentioned, the first communications system 110 comprises the first user equipment 112 and the first radio network node 114 serving the first user equipment 112. Further, the second radio communications system 120 comprises the second user equipment 122 and the second radio network node 124 serving the second user equipment 122. The first radio communications system 110 has a first priority in a first part of a shared radio spectrum and the second radio communications system 120 has a second priority in the first part of the shared radio spectrum, wherein the first priority is higher than the second priority.

The actions do not have to be performed in the order stated below, but may be taken in any suitable order. Further, actions may be combined. Optional actions are indicated by dashed boxes.

Action 601

In order to avoid causing interference at the first radio network node 114, the second user equipment 122 receives a signal S31 from the first radio network node 114. The signal S31 is configured to control a transmission S32 of the second user equipment 122, which transmission S32 may cause interference at the first radio network node 114, by means of an interfering signal S33 received at the first radio network node 114. The signal S31 may be configured to control the transmission S32 of the second user equipment 122 independently on whether or not the second user equipment 122 has been scheduled for transmission by the second radio network node 124.

In some embodiments, the signal S31 is further configured to control the second user equipment 122 not to perform the transmission S32.

The signal S31 may be configured to control the second user equipment 122 to transmit only up to a limited transmit power. The limited transmit power may be a reduced transmit power as compared to the normal maximum transmit power.

The signal S1 may be configured to control the transmission S32 of the second user equipment 122 for a specific period of time or for a specific frequency resource.

In some embodiments, wherein the signal S31 is dedicated for the second user equipment 122, the second user equipment 122 receives the signal S31 on a radio resource dedicated for the second user equipment 122.

The dedicated radio resource may comprise a time-domain resource, a frequency-domain resource, a code-domain resource or a combination thereof.

In some embodiments, wherein the signal S31 is non-dedicated for the second user equipment 122 and thus valid for one or more other second user equipment 122, the second user equipment 122 receives the signal S31 on a radio resource non-dedicated for the second user equipment 122.

The non-dedicated radio resource may comprise a time-domain resource, a frequency-domain resource, a code-domain resource or a combination.

A method in a first radio network node 114 for controlling interference between transmissions in the first radio communications system 110 and transmissions in the second communications system 120 will now be described with reference to FIG. 7, and to the previously described scenario of FIG. 3 for the schematic illustration of the signals S31-S33.

As previously mentioned, the first communications system 110 comprises the first user equipment 112 and the first radio network node 114 serving the first user equipment 112. Further, the second radio communications system 120 comprises the second user equipment 122 and the second radio network node 124 serving the second user equipment 122. The first radio communications system 110 has a first priority in a first part of a shared radio spectrum and the second radio communications system 120 has a second priority in the first part of the shared radio spectrum, wherein the first priority is higher than the second priority.

The actions do not have to be performed in the order stated below, but may be taken in any suitable order. Further, actions may be combined. Optional actions are indicated by dashed boxes.

Action 701

In order to avoid interference at the first radio network node 114, the first radio network node 114 transmits a signal S31 to the second user equipment 122. The signal S31 is configured to control a transmission S32 of the second user equipment 122, which transmission S32 may cause interference at the first radio network node 114, by means of an interfering signal S33 received at the first radio network node 114. The signal S31 may be configured to control the transmission S32 of the second user equipment 122 independently on whether or not the second user equipment 122 has been scheduled for transmission by the second radio network node 124.

In some embodiments, the signal S31 is configured to control the second user equipment 122 not to perform the transmission S32.

The signal S31 may be configured to control the second user equipment 122 to transmit only up to a limited transmit power. The limited transmit power may be a reduced transmit power as compared to the normal maximum transmit power.

The signal S31 may be configured to control the transmission S32 of the second user equipment 122 for a specific period of time or for a specific frequency resource.

In some embodiments, wherein the signal S31 is dedicated for the second user equipment 122, the first radio network node 114 transmits the signal S31 on a radio resource dedicated for the second user equipment 122.

The dedicated radio resource may comprise a time-domain resource, a frequency-domain resource, a code-domain resource or a combination thereof.

In some embodiments, wherein the signal S31 is non-dedicated for the second user equipment 122 and thus valid for one or more other second user equipment 122, the first radio network node 114 transmits the signal S31 on a radio resource non-dedicated for the second user equipment 122.

The non-dedicated radio resource, sometimes also referred to as common resource, may comprise a time-domain resource, a frequency-domain resource, a code-domain resource or a combination thereof.

A method in a second user equipment 122 for controlling interference between transmissions in the first radio communications system 110 and transmissions in the second communications system 120 will now be described with reference to FIG. 8, and to the previously described scenario of FIG. 4 for the schematic illustration of the signals S41-S45.

As previously mentioned, the first communications system 110 comprises the first user equipment 112 and the first radio network node 114 serving the first user equipment 112. Further, the second radio communications system 120 comprises the second user equipment 122 and the second radio network node 124 serving the second user equipment 122. The first radio communications system 110 has a first priority in a first part of a shared radio spectrum and the second radio communications system 120 has a second priority in the first part of the shared radio spectrum, wherein the first priority is higher than the second priority.

The actions do not have to be performed in the order stated below, but may be taken in any suitable order. Further, actions may be combined. Optional actions are indicated by dashed boxes.

Action 801

In order to prevent the second radio network node 124 to transmit a signal S42 to the second user equipment 122 if it is assumed that such a transmission S42 would experience too much interference S43, due to transmission S44 from the first radio network node 114, the second user equipment 122 receives a signal S41 from the first radio network node 114. The signal S41 is configured to inform the second user equipment 122 that the first radio network node 114 intends to transmit a downlink signal S44 to the first user equipment 112 at a certain point in time.

In some embodiments, the signal S42 may be seen as an intend-to-transmit signal that indicates to the second user equipment 122 an intention of the first radio network node 114 to transmit at some future time instance.

Action 802

The second user equipment 122 may estimate a first path loss between the second user equipment 122 and the first radio network node 114. The first path loss may give an indication of how strong interference a signal transmitted from the first radio network node 114 may cause at the second user equipment 122.

By estimating the first path loss, the second user equipment 122 may determine a signal quality of a signal, e.g. an interfering signal S43, transmitted from the first radio network node 114. Thus, the second user equipment 122 may determine the interference, e.g. a level of interference, such a signal would cause at the second user equipment 122.

The second user equipment 122 may determine the path loss as the difference between the transmit power that a received signal was transmitted with and the power the received signal had when it was received at the second user equipment 122.

The second user equipment 122 may measure the power of a received signal. Further, information about the transmit power may be comprised in the received signal. In some embodiments, information about the transmit power is signalled separately from the respective radio network node 114,124 to the second user equipment 122.

However, in some embodiments, the second user equipment 122 has no knowledge about the transmit power of signals transmitted from the radio network nodes 114,124. In such embodiments, the second user equipment 122 may assume that the transmit power of signals transmitted from the first radio network node 114 is the same as the transmit power of signals transmitted from the second radio network node 124.

In some embodiments, when the second user equipment 122 has no knowledge about the transmit power of signals transmitted from the radio network nodes 114,124, the second user equipment 122 may have knowledge about a relationship between the transmit power of signals transmitted from the first radio network node 114 and the transmit power of signals transmitted from the second radio network node 124. For example, the second user equipment 122 may know that the first radio network node 114 transmits signals with a transmit power that is 10 percent higher than the transmit power of signals transmitted from the second radio network node 124. This may be used when calculating the relative path loss.

Action 803

In some embodiments, the second user equipment 122 estimates a second path loss between the second user equipment 122 and the second radio network node 124. The second estimated path loss may give an indication of how strong a received signal from the second network node 124 may be. By estimating the second path loss, the second user equipment 122 may determine a signal quality of a signal S42 transmitted from the second radio network node 124. Thus, the second user equipment 122 may determine how affected such a signal S42 would be of interference caused by an interfering signal S43 transmitted from the first radio network node 114. For example, if the signal quality of the interfering signal S43 is above a certain service of quality level and the signal quality of the signal S42 is below a certain quality of service value, the second user equipment 122 would not be able to receive the signal S42 properly since the signal S42 will be too affected by the interfering signal S43.

Action 804

The second user equipment 122 may estimate a signal quality for an expected downlink signal S42 from the second radio network node 124 based on the estimated first and second path losses. In other words, the signal quality may be based on the indication of how good the reception quality of the signal may be, i.e. the first estimated path loss, and based on the indication on how strong the received signal may be, i.e. the second estimated path loss. In some embodiments, the signal quality of the expected downlink signal S42 is calculated as the ratio between the first estimated path loss and the second estimated path loss.

If the signal quality for the expected downlink signal S42 is deemed to be too low, i.e. to be below a certain service of quality level, this may be signaled to the second radio network node 124 as an indication that the second radio network node 124 should not transmit to the second user equipment 122. However, it should be understood that the second user equipment 122 may, based on the estimated channel quality, provide an indication to the second radio network node 124 that the second radio network node 124 may transmit i.e. that the estimated signal quality is above a certain service of quality level.

In some embodiments, the certain service of quality level is set by the owner or the administrator of the communications system 100. The certain service of quality level may be dynamically changeable over time in dependence of e.g. service quality requirements.

Action 805

The second user equipment 122 transmits an uplink signal S45 to the second radio network node 124. The uplink signal S45 is transmitted based on the received signal S41 and controls whether or not the second radio network node 124 should transmit a downlink signal S42 to the second user equipment 122.

In some embodiments, the second user equipment 122 transmits the uplink signal S45 based on an estimated signal quality of the signal S41. The estimated signal quality may be estimated by the second user equipment 122.

Figure 9:
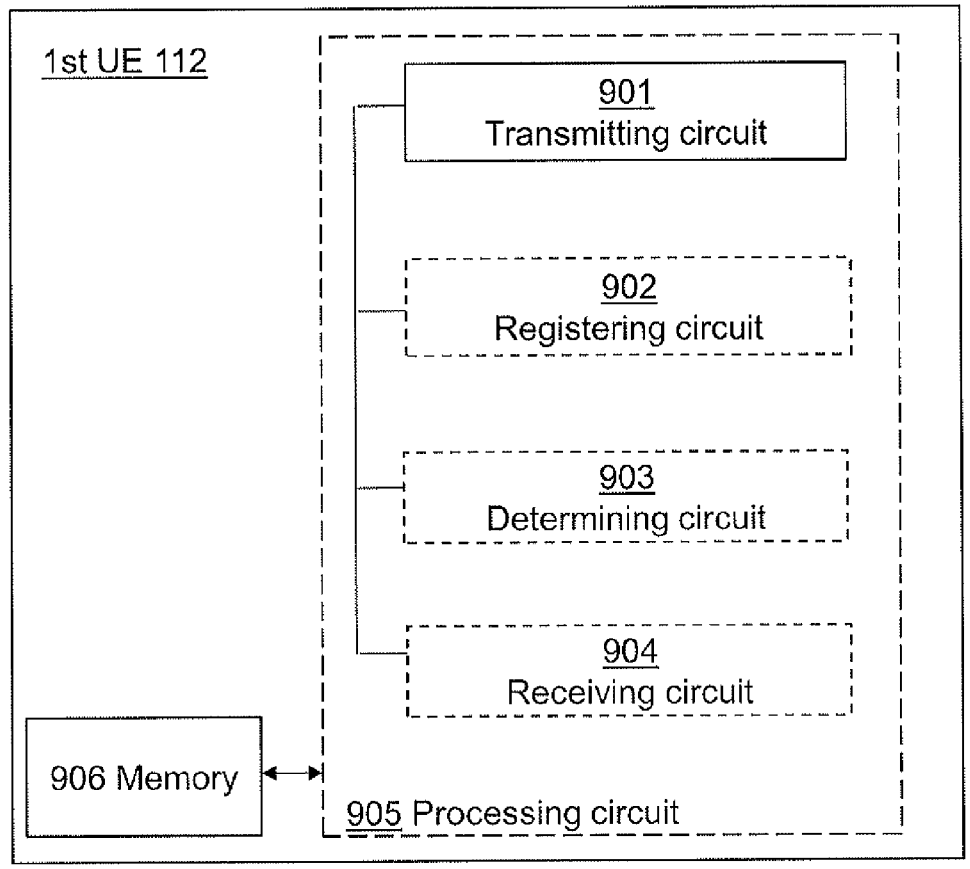
FIG. 9 is a schematic block diagram illustrating embodiments of a first user equipment.

To perform the method actions in the first user equipment 112 described above in relation to FIG. 5 for controlling interference between transmissions in the first radio communications system 110 and transmissions in the second communications system 120, the first user equipment 112 comprises the following arrangement depicted in FIG. 9.

As previously mentioned, the first communications system 110 comprises the first user equipment 112 and the first radio network node 114 serving the first user equipment 112. Further, the second radio communications system 120 comprises the second user equipment 122 and the second radio network node 124 serving the second user equipment 122. The first radio communications system 110 has a first priority in a first part of a shared radio spectrum and the second radio communications system 120 has a second priority in the first part of the shared radio spectrum, wherein the first priority is higher than the second priority.

The first user equipment 112 comprises a transmitting circuit 901 configured to transmit a signal S21 to a second radio network node 124 that is to perform a downlink transmission S22 to the second user equipment 122. The signal S21 is configured to control the transmission S22,S23 of the second radio network node 124. In other words, the signal S21 may be configured to control the downlink transmission S22 from the second radio network node 124 to the second user equipment 122 in order to avoid an interfering signal S23 at the first user equipment 112.

In some embodiments, the signal S21 is configured to prevent the second radio network node 124 from performing the downlink transmission S22.

The signal S21 may be configured to control the second radio network node 124 to transmit only with a limited transmit power. The limited transmit power may be a reduced transmit power as compared to the normal maximum transmit power.

The signal S21 may be configured to control the second radio network node 124 to perform only downlink control signaling S22.

In some embodiments, the signal S21 is configured to control the downlink transmission S22 of the second radio network node 124 for a specific period of time or for a specific frequency resource.

In some embodiments, wherein the signal S21 is dedicated for the second radio network node 124, the transmitting circuit 901 is configured to transmit the signal S21 on a radio resource dedicated for the second radio network node 124. The dedicated radio resource may comprise a time-domain resource, a frequency-domain resource, a code-domain resource or a combination thereof.

In some embodiments, wherein the signal S21 is non-dedicated for the second radio network node 124, and thus valid for one or more other second radio network nodes, the transmitting circuit 901 is configured transmit the signal S21 on a radio resource non-dedicated for the second radio network node 124. The non-dedicated radio resource, sometimes also referred to as common resource, may comprise a time-domain resource, a frequency-domain resource, a code-domain resource or a combination thereof.

The transmitting circuit 901 may further be configured to transmit the signal S21 in a resource dedicated for the first user equipment 112. The dedicated resource may comprise a time-domain resource, a frequency-domain resource, a code-domain resource or a combination thereof.

In some embodiments, the transmitting circuit 901 may further be configured to transmit the signal S21 in a resource non-dedicated for the first user equipment 112. The non-dedicated resource, sometimes also referred to as common resource, comprises a time-domain resource, a frequency-domain resource, a code-domain resource or a combination thereof.

During an on-going transmission session from the first radio network node 114, the transmitting circuit 901 may be configured to transmit the signal S21 to the second radio network node 124 based on an expectation to receive a downlink transmission S24 from the first radio network node 114 at certain point in time. The downlink transmission S24 would be interfered by a downlink transmission S23 from the second radio network node 124 at the same point in time.

The transmitting circuit 901 may further be configured to transmit the signal S21 to the second radio network node 124 when an estimated path loss is below a predefined value. The estimated path loss may be determined by a determining circuit 903 which will be described below.

The first user equipment 112 may further comprise a registering circuit 902 configured to register the first user equipment 112 to the one or more second radio network node 124 by performing high level signaling.

In some embodiments, the registering circuit 902 is configured to register to the one or more radio network nodes 124 by communicating with the second radio network node in advance, such as before the first user equipment 112 transmits the signal S21.

However, it should be understood that the first user equipment 112 may register to the second radio network node 124 via the first communication system 110, whereby the second radio network node 124 may be informed by the first communication system 110 via backhaul signalling to listen to and obey possible S21 signalling from certain first user equipments 112.

The registering circuit 902 may be configured to register the first user equipment 112 to the second radio network node 124 when a relative path loss is below a predefined value. The relative path loss may be determined by a determining circuit 903 which will be described below.

In some embodiments, the registering circuit 902 may be configured to register to the second radio network node 124 based on determined path loss estimates. The path loss estimates may be determined by the determining circuit 903 described below.

In some embodiments, the first user equipment 112 comprises further a determining circuit 903 configured to determine a relative path loss as the estimate path loss between the first user equipment 112 and the second radio network node 124 relative to the estimated path loss between the first user equipment 112 and the first radio network node 114.

The determining circuit 903 may determine an estimate of the path loss between the first user equipment 112 and the second radio network node 124, and an estimate of the path loss between the first user equipment 112 and the first radio network node 114. As is mentioned above, the registering circuit 902 may register to the second radio network node 124 when at least one of the determined path loss estimates is below a respective predefined value.

The determining circuit 903 may determine the path loss as the difference between the transmit power that a received signal was transmitted with and the power the received signal had when it was received at the first user equipment 112.

The determining circuit 903 may measure the power of a received signal. Further, information about the transmit power may be comprised in the received signal. In some embodiments, information about the transmit power is signalled separately from the respective radio network node 114,124 to the first user equipment 112.

However, in some embodiments, the determining circuit 903 has no knowledge about the transmit power of signals transmitted from the radio network nodes 114,124. In such embodiments, the determining circuit 903 may assume that the transmit power of signals transmitted from the first radio network node 114 is the same as the transmit power of signals transmitted from the second radio network node 124.

In some embodiments, when the determining circuit 903 has no knowledge about the transmit power of signals transmitted from the radio network nodes 114,124, the determining circuit 903 may have knowledge about a relationship between the transmit power of signals transmitted from the first radio network node 114 and the transmit power of signals transmitted from the second radio network node 124. For example, the determining circuit 903 may know that the first radio network node 114 transmits signals with a transmit power that is 10 percent higher than the transmit power of signals transmitted from the second radio network node 124. This may be used when calculating the relative path loss.

The first user equipment 112 may further comprise a receiving circuit 904 configured to receive signals from the first and second radio network nodes 114,124.

Embodiments herein for controlling interference between transmissions in the first radio communications system 110 and transmissions in the second communications system 120 may be implemented through one or more processors, such as a processing circuit 905 in the first user equipment 112 depicted in FIG. 9, together with computer program code for performing the functions and/or method actions of embodiments herein.

It should be understood that one or more of the circuits comprised in the first user equipment 112 described above may be integrated with each other to form an integrated circuit.

The first user equipment 112 may further comprise a memory 906. The memory may comprise one or more memory units and may be used to store for example data such as thresholds, predefined or preset information, etc.

Figure 10:
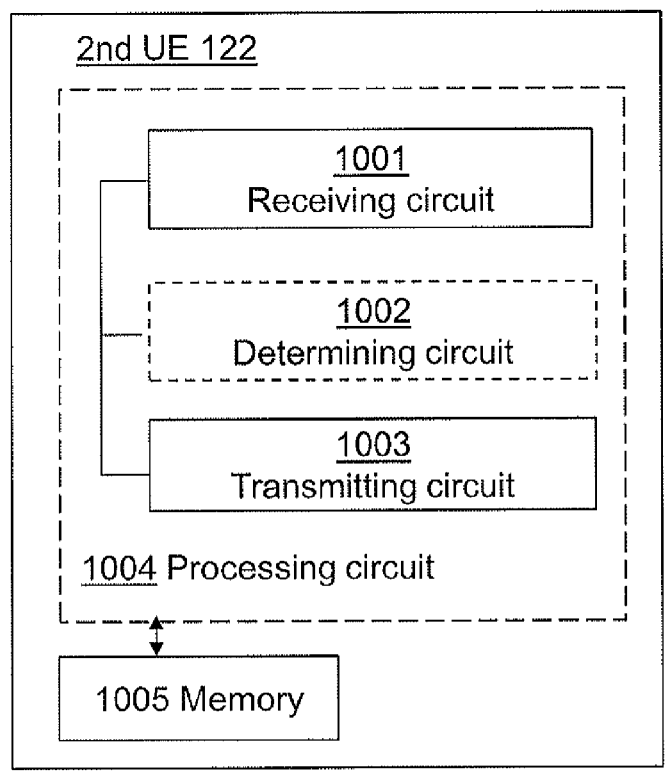
FIG. 10 is a schematic block diagram illustrating embodiments of a second user equipment.

To perform the method actions in the second user equipment 122 described above for controlling interference between transmissions in the first radio communications system 110 and transmissions in the second communications system 120, the second user equipment 122 comprises the following arrangement depicted in FIG. 10.

As previously mentioned, the first communications system 110 comprises the first user equipment 112 and the first radio network node 114 serving the first user equipment 112. Further, the second radio communications system 120 comprises the second user equipment 122 and the second radio network node 124 serving the second user equipment 122. The first radio communications system 110 has a first priority in a first part of a shared radio spectrum and the second radio communications system 120 has a second priority in the first part of the shared radio spectrum, wherein the first priority is higher than the second priority.

In some embodiments, e.g. embodiments relating to FIG. 3, the second user equipment 122 comprises a receiving circuit 1001 configured to receive a signal S31 from the first radio network node 114. The signal S31 is configured to control a transmission S32 of the second user equipment 122.

In some embodiments, the signal S31 is configured to control the second user equipment 122 not to perform the transmission S32.

The signal S31 may be configured to control the second user equipment 122 to transmit only up to a limited transmit power. The limited transmit power may be a reduced transmit power as compared to the normal maximum transmit power.

The signal S31 may further be configured to control the transmission of the second user equipment 122 for a specific period of time or for a specific frequency resource.

In some embodiments, wherein the signal S31 is dedicated for the second user equipment 122 the receiving circuit 1101 is further configured to receive the signal on a radio resource dedicated for the second user equipment 122. The dedicated radio resource may comprise a time-domain resource, a frequency-domain resource, a code-domain resource or a combination thereof.

In some other embodiments, wherein the signal S31 is non-dedicated for the second user equipment 122, and thus valid for one or more other second user equipment 122, the receiving circuit 1101 is further configured to receive the signal on a radio resource non-dedicated for the second user equipment 122. The non-dedicated radio resource may comprise a time-domain resource, a frequency-domain resource, a code-domain resource or a combination thereof.

In some embodiments, e.g. embodiments relating to FIG. 4, the receiving circuit 1001 configured to receive a signal S41 from the first radio network node 114. The signal S41 is configured to inform the second user equipment 122 that the first radio network node 114 intends to transmit a downlink signal S44 to the first user equipment 112 at a certain point in time.

In some embodiments, the second user equipment 122 further comprises a determining circuit 1002. The determining circuit 1002 may be configured to determine a first estimate of a path loss between the second user equipment 122 and the first radio network node 114. The determining circuit 1002 is further configured to determine a second estimate of a path loss between the second user equipment 122 and the second radio network node 124. Based on the first and second estimates of path loss, the determining circuit 1002 is configured to determine a signal quality for an expected signal from the second radio network node.

The determining circuit 1002 may determine the path loss as the difference between the transmit power that a received signal was transmitted with and the power the received signal had when it was received at the second user equipment 122.

The determining circuit 1002 may measure the power of a received signal. Further, information about the transmit power may be comprised in the received signal. In some embodiments, information about the transmit power is signalled separately from the respective radio network node 114,124 to the second user equipment 122.

However, in some embodiments, the determining circuit 1002 has no knowledge about the transmit power of signals transmitted from the radio network nodes 114,124. In such embodiments, the determining circuit 1002 may assume that the transmit power of signals transmitted from the first radio network node 114 is the same as the transmit power of signals transmitted from the second radio network node 124.

In some embodiments, when the determining circuit 1002 has no knowledge about the transmit power of signals transmitted from the radio network nodes 114,124, the determining circuit 1002 may have knowledge about a relationship between the transmit power of signals transmitted from the first radio network node 114 and the transmit power of signals transmitted from the second radio network node 124. For example, the determining circuit 1002 may know that the first radio network node 114 transmits signals with a transmit power that is 10 percent higher than the transmit power of signals transmitted from the second radio network node 124. This may be used when calculating the relative path loss.

The second user equipment 122 may further comprise a transmitting circuit 1003 configured to transmit an uplink signal S45 to the second radio network node 124. The transmitting circuit 1003 may be configured to transmit the uplink signal S45 based on the signal S41 received from the first radio network node 114. In some embodiments, the transmitting circuit 1003 is configured to transmit the signal S45 based on an expected signal quality of the signal S41. The expected signal quality may be determined by the second user equipment 122, e.g. by means of the determining circuit 1002. The expected signal quality of the signal S41 may be determined based on an estimated path loss between the first radio network node 114 and the second user equipment 122.

The uplink signal S45 is configured to control, whether or not the second radio network node 124 should perform a downlink transmission S42 to the second user equipment 122.

Embodiments herein for controlling interference between transmissions in the first radio communications system 110 and transmissions in the second communications system 120 may be implemented through one or more processors, such as a processing circuit 1004 in the second user equipment 122 depicted in FIG. 10, together with computer program code for performing the functions and/or method actions of embodiments herein.

It should be understood that one or more of the circuits comprised in the second user equipment 122 described above may be integrated with each other to form an integrated circuit.

The second user equipment 122 may further comprise a memory 1005. The memory may comprise one or more memory units and may be used to store for example data such as thresholds, predefined or preset information, etc.

Figure 11:
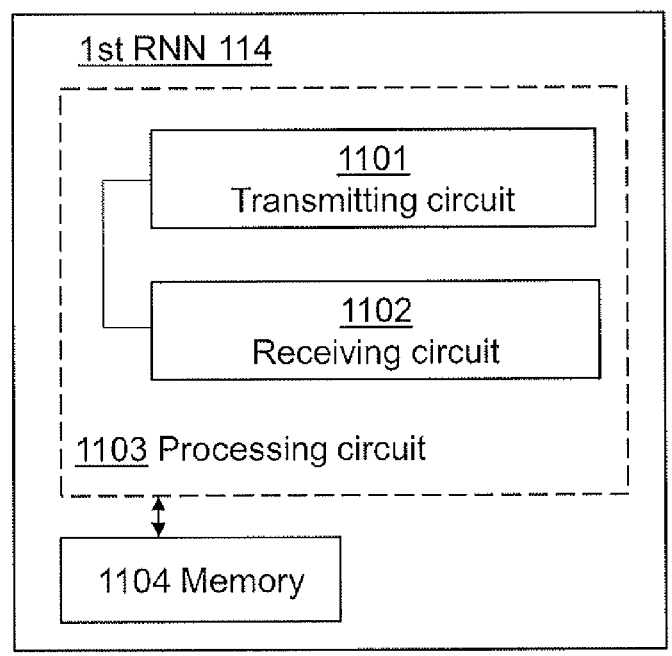
FIG. 11 is a schematic block diagram illustrating embodiments of a first radio network node.

To perform the method actions in the first radio network node 114 described above for controlling interference between transmissions in the first radio communications system 110 and transmissions in the second communications system 120, the second user equipment 122 comprises the following arrangement depicted in FIG. 11.

As previously mentioned, the first communications system 110 comprises the first user equipment 112 and the first radio network node 114 serving the first user equipment 112. Further, the second radio communications system 120 comprises the second user equipment 122 and the second radio network node 124 serving the second user equipment 122. The first radio communications system 110 has a first priority in a first part of a shared radio spectrum and the second radio communications system 120 has a second priority in the first part of the shared radio spectrum, wherein the first priority is higher than the second priority.

The first radio network node 114 comprises a transmitting circuit 1101 configured to transmit a signal S31 to the second user equipment 122. The signal S31 is configured to control a transmission S32 of the second user equipment 122.

The signal S31 may further be configured to control the second user equipment 122 not to perform the transmission S32.

The signal S31 may be configured to control the second user equipment 122 to transmit only up to a limited transmit power. The limited transmit power may be a reduced transmit power as compared to the normal maximum transmit power.

In some embodiments, the signal S31 is further configured to control the transmission of the second user equipment 122 for a specific period of time or for a specific frequency resource.

In some embodiments, wherein the signal S31 is dedicated for the second user equipment 122, the transmitting circuit 1101 may further be configured to transmit the signal S31 on a radio resource dedicated for the second user equipment 122. The dedicated radio resource may comprise a time-domain resource, a frequency-domain resource, a code-domain resource or a combination thereof.

In some other embodiments, wherein the signal S31 is non-dedicated for the second user equipment 122 and valid for one or more other second user equipment 122, the transmitting circuit 1101 may further be configured to transmit the signal S31 on a radio resource non-dedicated for the second user equipment 122. The non-dedicated radio resource may comprise a time-domain resource, a frequency-domain resource, a code-domain resource or a combination thereof.

The first radio network node 114 may further comprise a receiving circuit 1102 configured to receive signals from the first and second user equipments, 112,122.

Embodiments herein for controlling interference between transmissions in the first radio communications system 110 and transmissions in the second communications system 120 may be implemented through one or more processors, such as a processing circuit 1103 in the first radio network node 114 depicted in FIG. 11, together with computer program code for performing the functions and/or method actions of embodiments herein.

It should be understood that one or more of the circuits comprised in the first radio network node 114 described above may be integrated with each other to form an integrated circuit.

The first radio network node 114 may further comprise a memory 1104. The memory may comprise one or more memory units and may be used to store for example data such as thresholds, predefined or preset information, etc.

The following is applicable to any suitable embodiment described above. In some embodiments described herein, non-equality between the communications systems 110,120 has been assumed. More specifically, it has been assumed that the first communications system 110 is a primary system with a higher priority, and that the second communications system 120 is a secondary system with a lower priority. As previously mentioned, the priorities of the communications systems 110,120 are set by the owner or the administrator of the shared radio spectrum.

Different means may be used to compensate for the inequality between the communications systems 110,120, i.e. to ensure that, at least on a more long-term basis, the first and second communications systems 110,120 have the same overall access to the spectrum resource.

For example, the spectrum may be divided into two parts, e.g. part A and part B. One of the communications systems 110,120 may then be a primary system in spectrum part A and a secondary system in spectrum part B, while the other one of the communications systems 110,120 may be a secondary system in spectrum part A and primary system in spectrum part B. As understood by those skilled in the art, the above described actions and features should then be performed on a per-spectrum-part basis.

As another example, the priority of the two communications systems 110,120 may be varied over time so that the role of being primary and secondary system is varying over time according to some pre-defined rule.

Further, embodiments herein have been described with reference to two communications systems 110,120. However, embodiments may comprise more than two communications systems of different priorities. In general, embodiments herein may comprise N communications systems with priorities prio-1, prio-2, . . . prio-N, wherein prio-1 corresponds to the highest priority and prio-N corresponds to the lowest priority. The embodiments described herein would then correspond to N=2, with the first communications system 110 having a priority corresponding to prio-1 and the second communications system 120 having a priority corresponding to prio-2.

In case of more than two communications systems, a communications system with priority X may behave as a secondary communications system in relation to all communications systems having a priority Y, which priority Y is higher than the priority X. Thus, all communications systems having the priority Y will behave as a primary communications system in relation the communications system with priority X.

Correspondingly, the communications system with priority X may behave as a primary communications system versus all communications systems having a priority Z, which priority Z is less than the priority X. The communications systems having the priority Z will behave as secondary communications system in relation to the communications system with priority X.

Thus, the fairness between two communications systems as described in embodiments herein may be extended to the case of N communications systems.

Further, in case of spectrum division as described above, the overall available spectrum may be split into M parts where the different communications systems may be assigned different priorities in the different spectrum parts.

Furthermore, in case of time variation as described above, the priorities of each communications system may be changed over time according to some pre-defined rule.

Although the description above contains many specifics, they should not be construed as limiting but as merely providing illustrations of some presently preferred embodiments. The technology fully encompasses other embodiments which may become apparent to those skilled in the art. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for a device or method to address each and every problem sought to be solved by the described technology for it to be encompassed hereby.

When using the word "comprise" or "comprising" it shall be interpreted as non-limiting, in the meaning of consist at least of.

When using the word action/actions it shall be interpreted broadly and not to imply that the actions have to be carried out in the order mentioned. Instead, the actions may be carried out in any suitable order other than the order mentioned. Further, some action/actions may be optional.

Further, the dotted boxes and dotted arrows in the drawings schematically illustrate optional features and actions of embodiments herein.

The embodiments herein are not limited to the above described examples. Various alternatives, modifications and equivalents may be used. Therefore, the above examples should not be taken as limiting the scope of the invention, which is defined by the appending claims.

The invention claimed is:

1. A method in a second user equipment for controlling interference between transmissions in a first radio communications system comprising a first user equipment and a first radio network node serving the first user equipment, and transmissions in a second radio communications system comprising the second user equipment and a second radio network node serving the second user equipment, wherein the first radio communications system has a first priority in a first part of a shared radio spectrum and the second radio communications system has a second priority in the first part of the shared radio spectrum, wherein the first priority is higher than the second priority, and wherein the method comprises:
receiving a signal from the first radio network node, which signal is configured to control a transmission of the second user equipment directed to the second radio communications system, whereby interference in the first radio communications system caused by transmissions from the second radio communications system is controlled, and whereby transmissions in the first radio communication system is prioritized,
wherein the signal further is configured to control the second user equipment not to perform the transmission.

2. The method of claim 1, wherein the signal further is configured to control the transmission of the second user equipment for a specific period of time or for a specific frequency resource.

3. The method of claim 1, wherein the signal is dedicated for the second user equipment and wherein the receiving of the signal further comprises:
receiving the signal on a radio resource dedicated for the second user equipment, wherein the radio resource comprises a time-domain resource, a frequency-domain resource, a code-domain resource or a combination thereof.

4. The method of claim 1, wherein the signal is non-dedicated for the second user equipment and valid for one or more other second user equipment, and wherein the receiving of the signal further comprises:
receiving the signal on a radio resource non-dedicated for the second user equipment, wherein the radio resource comprises a time-domain resource, a frequency-domain resource, a code-domain resource or a combination thereof.

5. The method in a second user equipment according to claim 1, wherein the transmission of the second user equipment has been scheduled by the second radio network node.

6. A method in a first radio network node for controlling interference between transmissions in a first radio communications system comprising a first user equipment and the first radio network node serving the first user equipment, and transmissions in a second radio communications system comprising a second user equipment and a second radio network node serving the second user equipment, wherein the first radio communications system has a first priority in a first part of a shared radio spectrum and the second radio communications system has a second priority in the first part of the shared radio spectrum, wherein the first priority is higher than the second priority, and wherein the method comprises:
transmitting a signal to the second user equipment, which signal is configured to control a transmission of the second user equipment directed to the second radio communications system, whereby interference in the first radio communications system caused by transmissions from the second radio communications system is controlled, and whereby transmissions in the first radio communication system is prioritized,
wherein the signal further is configured to control the second user equipment not to perform the transmission.

7. The method of claim 6, wherein the signal further is configured to control the transmission of the second user equipment for a specific period of time or for a specific frequency resource.

8. The method of claim 6, wherein the signal is dedicated for the second user equipment and wherein the transmitting of the signal further comprises:
transmitting the signal on a radio resource dedicated for the second user equipment, wherein the radio resource comprises a time-domain resource, a frequency-domain resource, a code-domain resource or a combination thereof.

9. The method of 6, wherein the signal is non-dedicated for the second user equipment and valid for one or more other second user equipment, and wherein the transmitting of the signal further comprises: transmitting the signal on a radio resource non-dedicated for the second user equipment, wherein the radio resource comprises a time-domain resource, a frequency-domain resource, a code-domain resource or a combination thereof.

10. A second user equipment for controlling interference between transmissions in a first radio communications system comprising a first user equipment and a first radio network node serving the first user equipment, and transmissions in a second radio communications system comprising the second user equipment and a second radio network node serving the second user equipment, wherein the first radio communications system has a first priority in a first part of a shared radio spectrum and the second radio communications system has a second priority in the first part of the shared radio spectrum, wherein the first priority is higher than the second priority, and wherein the second user equipment comprises:
 a receiving circuit configured to receive a signal from the first radio network node, which signal is configured to control a transmission of the second user equipment directed to the second radio communications system, whereby interference in the first radio communications system caused by transmissions from the second radio communications system is controlled, and whereby transmissions in the first radio communication system is prioritized,
 wherein the signal is configured to control the second user equipment not to perform the transmission.

11. The second user equipment of claim 10, wherein the signal further is configured to control the transmission of the second user equipment for a specific period of time or for a specific frequency resource.

12. The second user equipment of claim 10, wherein the signal is dedicated for the second user equipment and wherein the receiving circuit further is configured to:
 receive the signal on a radio resource dedicated for the second user equipment, wherein the radio resource comprises a time-domain resource, a frequency-domain resource, a code-domain resource or a combination thereof.

13. The second user equipment of claim 10, wherein the signal is non-dedicated for the second user equipment and valid for one or more other second user equipment, and wherein the receiving circuit further is configured to:
 receive the signal on a radio resource non-dedicated for the second user equipment, wherein the radio resource comprises a time-domain resource, a frequency-domain resource, a code-domain resource or a combination thereof.

14. A first radio network node for controlling interference between transmissions in a first radio communications system comprising a first user equipment and the first radio network node serving the first user equipment, and transmissions in a second radio communications system comprising a second user equipment and a second radio network node serving the second user equipment, wherein the first radio communications system has a first priority in a first part of a shared radio spectrum and the second radio communications system has a second priority in the first part of the shared radio spectrum, wherein the first priority is higher than the second priority, and wherein the first radio network node comprises:
 a transmitting circuit configured to transmit a signal to the second user equipment, wherein the signal is configured to control a transmission of the second user equipment directed to the second radio communications system, whereby interference in the first radio communications system caused by transmissions from the second radio communications system is controlled, and whereby transmissions in the first radio communication system is prioritized,
 wherein the signal further is configured to control the second user equipment not to perform the transmission.

15. The first radio network node of claim 14, wherein the signal further is configured to control the transmission of the second user equipment for a specific period of time or for a specific frequency resource.

* * * * *